(12) United States Patent
Nomiyama et al.

(10) Patent No.: US 10,094,005 B2
(45) Date of Patent: Oct. 9, 2018

(54) CERMET AND CUTTING TOOL

(71) Applicant: KYOCERA Corporation, Kyoto-shi, Kyoto (JP)

(72) Inventors: Ryoma Nomiyama, Satsumasendai (JP); Hideyoshi Kinoshita, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/531,090

(22) PCT Filed: Aug. 28, 2015

(86) PCT No.: PCT/JP2015/074463
§ 371 (c)(1),
(2) Date: May 26, 2017

(87) PCT Pub. No.: WO2016/084443
PCT Pub. Date: Jun. 2, 2016

(65) Prior Publication Data
US 2017/0327932 A1    Nov. 16, 2017

(30) Foreign Application Priority Data
Nov. 27, 2014  (JP) ................. 2014-239988

(51) Int. Cl.
*C22C 29/04*  (2006.01)
*C22C 1/05*  (2006.01)
(Continued)

(52) U.S. Cl.
CPC ............ *C22C 29/04* (2013.01); *B23B 27/148* (2013.01); *C22C 1/05* (2013.01); *B22F 3/10* (2013.01); *B23B 2222/16* (2013.01)

(58) Field of Classification Search
CPC ......... C22C 29/04; C22C 1/05; B23B 27/148; B23B 2222/16; B22F 3/10
See application file for complete search history.

(56) References Cited

U.S. PATENT DOCUMENTS 5,370,719 A   12/1994 Teruuchi et al.
5,460,893 A   10/1995 Teruuchi et al.
(Continued)

FOREIGN PATENT DOCUMENTS

DE    4339089 A1    6/1994
DE    4406961 A1    9/1994
(Continued)

OTHER PUBLICATIONS

Machine Translation of JP 2009-154224 to Manashi et al. (the JP document has been submitted in the IDS) (Year: 2009).*

*Primary Examiner* — Pegah Parvini
(74) *Attorney, Agent, or Firm* — Volpe and Koenig, P.C.

(57) ABSTRACT

A cermet and a cutting tool are provided which have high wear resistance and high fracture resistance at a cutting edge even in a mode of cutting where the cutting edge comes to have a high temperature. A cermet 1 includes a hard phase 2 including a carbonitride of one or more kinds of metals selected from Group 4, Group 5, and Group 6 metals of the periodic table including at least Ti and a binder phase 3 containing W and at least one kind of a metal selected from Co and Ni, wherein the binder phase 3 includes a first binder phase 4 in which a mass ratio of W to a total amount of Co and Ni (W/(Co+Ni)) is 0.8 or less and a second binder phase 5 in which a mass ratio of W to a total amount of Co and Ni (W/(Co+Ni)) is 1.2 or more.

11 Claims, 2 Drawing Sheets

(51) Int. Cl.
*B23B 27/14* (2006.01)
*B22F 3/10* (2006.01)

(56) References Cited

U.S. PATENT DOCUMENTS

| | | | | |
|---|---|---|---|---|
| 2010/0089203 | A1* | 4/2010 | Kinoshita | C22C 29/04 75/238 |
| 2012/0114960 | A1* | 5/2012 | Takesawa | C22C 1/051 428/565 |
| 2013/0036866 | A1* | 2/2013 | Tamura | C22C 29/04 75/240 |
| 2013/0092449 | A1 | 4/2013 | Fang et al. | |

FOREIGN PATENT DOCUMENTS

| EP | 1892051 A1 | 2/2008 |
|---|---|---|
| JP | 2009-154224 A | 7/2009 |

* cited by examiner

CERMET AND CUTTING TOOL

TECHNICAL FIELD

The present invention relates to a cermet and a cutting tool.

BACKGROUND ART

Currently, a cermet containing titanium as a major component is widely used as a material of a member that requires wear resistance, sliding properties, and fracture resistance, such as a cutting tool, a wear-resistant member, or a sliding member.

For example, patent document 1 discloses a cermet composed of a hard phase such as titanium carbonitride and a metal binder phase mainly made of cobalt, wherein the metal binder phase includes a composite carbide phase of tungsten and cobalt having a hexagonal crystal structure.

RELATED ART DOCUMENT

Patent Document

Patent Document 1: Japanese Unexamined Patent Publication No. 2009-154224

SUMMARY OF THE INVENTION

Problems to be Solved by the Invention

However, it is demanded that a cermet is provided with wear resistance and fracture resistance that can withstand use at a high temperature. For example, when the cermet disclosed in the above patent document 1 is used for high-speed cutting that generates high heat, the effect thereof has been still insufficient, though having an effect of enhancing the wear resistance. Also, in addition to wear resistance, an improvement in fracture resistance has been required.

Means for Solving the Problems

A cermet according to the present embodiment includes a hard phase including a carbonitride of one or more kinds of metals selected from Group 4, Group 5, and Group 6 metals of the periodic table including at least Ti and a binder phase containing metal W and at least one kind of a metal selected from metal Co and metal Ni. The binder phase includes a first binder phase in which a mass ratio of metal W to a total amount of metal Co and metal Ni (W/(Co+Ni)) is 0.8 or less and a second binder phase in which a mass ratio of metal W to a total amount of metal Co and metal Ni (W/(Co+Ni)) is 1.2 or more.

A cutting tool according to the present embodiment comprises the above-described cermet as a substrate.

Effects of the Invention

According to the cermet of the present embodiment, wear resistance and fracture resistance at a high temperature can be enhanced.

According to the cutting tool of the present embodiment, wear resistance and fracture resistance at a high temperature can be enhanced, and a cutting tool capable of being used for a long period of time can be provided.

EMBODIMENTS FOR CARRYING OUT THE INVENTION

Figure 1:
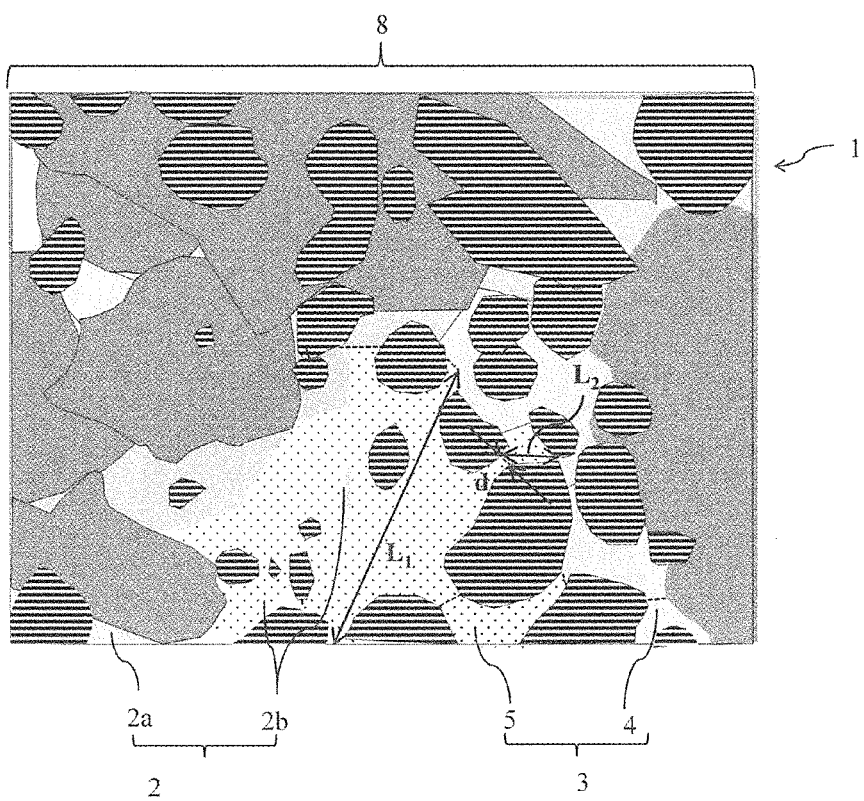
FIG. 1 is a schematic view showing one example of the cermet of the present embodiment.

One example of the cermet of the present embodiment will be described with reference to the schematic view of the cermet of FIG. 1.

A cermet 1 of the present embodiment includes a hard phase 2 including a carbonitride of one or more kinds of metals selected from Group 4, Group 5, and Group 6 metals of the periodic table including at least Ti and a binder phase 3 containing W and at least one kind of a metal selected from Co and Ni. In a microscope observation of the cermet 1, the area ratio of the hard phase 2 is 65 to 95% by area, and the area ratio of the binder phase 3 is 5 to 35% by area. The area ratio can be calculated by the image analysis method from a microscope photograph of the cermet 1. In the present embodiment, the hard phase 2 contains Ti as a major component.

The binder phase 3 contains a first binder phase 4 in which a mass ratio of W to a total amount of Co and Ni (W/(Co+Ni)) is 0.8 or less and a second binder phase 5 in which a mass ratio of W to a total amount of Co and Ni (W/(Co+Ni)) is 1.2 or more. Distinction between the first binder phase 4 and the second binder phase 5 is made as follows. By microscope observation of the cermet 1, distribution of each metal element is confirmed with use of an electron probe microanalyzer (EPMA), and the distinction is made based on the ratio of the metal elements at each location.

Here, a method of specifying a contour of the first binder phase 4 and the second binder phase 5 will be described. When a constriction part is found by observation of an outer shape of the first binder phase 4 or the second binder phase 5, the smallest length of the constriction part is assumed to be a boundary, and determination is made as follows. For example, when a constriction part is found by observation of an outer shape of the second binder phase 5 as shown in FIG. 1 and when both of the largest lengths $L_1$ and $L_2$ of the second binder phase 5 located in two regions with this constriction part interposed therebetween are three times or more as large as the smallest length d of the constriction part, it is determined that the constriction part is a boundary, and that two second binder phases 5 are present with this boundary interposed therebetween. On the other hand, when either one of the largest lengths of the two regions with the smallest length of the constriction part interposed therebetween is less than three times as large as the smallest length d of the constriction part, it is determined that there is no boundary, and that the two regions are one. Here, boundaries between the first binder phases 4 with each other, between the second binder phases 5 with each other, and between the first binder phase 4 and the second binder phase 5 are shown with dotted lines in FIG. 1.

Further, the boundary between the first binder phase 4 and the second binder phase 5 is specified by confirming the mass ratio of W to the total amount of Co and Ni (W/(Co+Ni)). Also, other binder phases belonging to neither the first binder phase 4 nor the second binder phase 5 may be present between the first binder phase 4 and the second binder phase 5. In this case as well, the boundary between the first binder phase 4, the second binder phase 5, and the other binder phases is specified by confirming the mass ratio of W to the total amount of Co and Ni (W/(Co+Ni)).

Here, in a microscope photograph of the cermet 1, measurement is made at a magnification such that the first binder phase 4 and the second binder phase 5 are present and such that three or more first binder phases 4 (three or more sites of the first binder phase 4) and three or more second binder phases 5 (three or more sites of the second binder phase 5) are present.

The cermet 1 having such a configuration has a high heat-dissipation property. For this reason, when this cermet 1 is used as a substrate of a cutting tool, the temperature of the cutting edge is less liable to increase at the time of cutting, so that the wear resistance at the cutting edge is improved. Further, the second binder phase 5 has a higher elasticity than the composite carbonitride of W and Co, so that, when a shock is applied to the cermet 1, the second binder phase 5 can absorb the shock by being elastically deformed. For this reason, the fracture resistance of the cermet 1 can be enhanced. Also, since the first binder phase 4 has a high wettability to the hard phase 2, development of cracks is decreased, thereby enhancing the fracture resistance of the cermet 1 in this respect as well.

Further, in the present embodiment, in a microscope photograph, the area ratio W1 of the first binder phase 4 is 15 to 22% by area; the area ratio W2 of the second binder phase 5 is 2 to 20% by area; and a sum of W1 and W2 is 17 to 35% by area. The measurement is made at arbitrary three or more sites and evaluated by a mean value thereof.

Furthermore, in the present embodiment, a ratio of a sum of a total area ratio S1 of the first binder phase 4 (which may hereafter be simply referred to as S1) and a total area ratio S2 of the second binder phase 5 (which may hereafter be simply referred to as S2) relative to a total area ratio of a whole of the binder phase 3 is 0.9 or more. In other words, most of the binder phase 3 may be composed of the first binder phase 4 and the second binder phase 5, and other binder phases may be present at an area ratio of less than 0.1 relative to the whole of the binder phase 3. The other binder phases which are neither the first binder phase 4 nor the second binder phase 5 satisfy a relationship such that the mass ratio of W to a total amount of Co and Ni (W/(Co+Ni)) is 0.8<(W/(Co+Ni))<1.2; however, the other binder phases may be present between the first binder phase 4 and the second binder phase 5 or in a neighborhood of an interface between the binder phase 3 (first binder phase 4 or second binder phase 5) and the hard phase 2. Here, in FIG. 1, a structure is shown in which the other binder phases are not present.

Further, the ratio of S2 to S1 (S2/S1) is 0.2 to 1.5. This enhances both the wear resistance and the fracture resistance of the cermet 1. A particularly preferable range of the ratio of S2 to S1 (S2/S1) is 0.3 to 1.2.

Here, the total area ratio S1 of the first binder phase 4 is a total sum of the area ratio of each of the first binder phases 4 in a microscope photograph. Similarly, the total area ratio S2 of the second binder phase 5 is a total sum of the area ratio of each of the second binder phases 5. Likewise, the total area ratio of the whole of the binder phase 3 is a total sum of the area ratio of all the binder phases constituting the binder phase 3.

Furthermore, in the present embodiment, a ratio of a mean area ratio s2 of the second binder phases to a mean area ratio s1 of the first binder phases (s2/s1) is 1.0 to 3.0. This enhances the heat dissipation property of the cermet 1, and also a compression stress is generated in the cermet 1, thereby enhancing the fracture resistance of the cermet 1. A particularly preferable range of the ratio (s2/s1) may be 1.2 to 1.7.

The mean area ratio s1 is a mean value of the area ratio of each first binder phase 4 that is present in a microscope photograph, and the mean area ratio s2 is a mean value of the area ratio of each second binder phase 5 that is present in a microscope photograph. These are measured by the image analysis method.

The hard phase 2 includes a TiCN phase 2a and a solid solution phase 2b including a composite carbonitride of Ti and one or more kinds of metals selected from Group 4, Group 5, and Group 6 metals of the periodic table other than Ti. This structure improves the toughness of the hard phase 2, whereby the fracture resistance can be improved without deteriorating the wear resistance. Also, a part of the hard phase 2 may have a core-containing structure in which a core part composed of the TiCN phase 2a is surrounded by peripheral parts composed of the solid solution phase 2b. Further, other hard phases such as a hard phase that does not contain Ti or a hard phase that includes carbide or nitride of one or more kinds of metals selected from Group 4, Group 5, and Group 6 metals of the periodic table may be present as a hard phase other than the hard phase 2 appearing in FIG. 1; however, in a microscope photograph, the area ratio of the other hard phases relative to the area ratio of the whole of the hard phase may be 10% by area or less in a sum. In the present embodiment, distribution of the Group 4, Group 5, and Group 6 metals is confirmed by electron probe microanalyzer (EPMA) analysis in scanning electron microscope (SEM) observation, and those in which Ti and Group 4, Group 5, and Group 6 metals of the periodic table other than Ti have been observed are identified as the solid solution phase 2b including a composite carbonitride.

In the present embodiment, the hard phase 2 includes a TiCN phase 2a and a solid solution phase 2b including a composite carbonitride containing Ti and W, where an atomic ratio of W of the second binder phase 5 is larger than an atomic ratio of W of the solid solution phase 2b, and an atomic ratio of W of the first binder phase 4 is equal to or smaller than an atomic ratio of W of the solid solution phase 2b.

Here, the atomic ratios of W of the solid solution phase 2b and the second binder phase 5 can be measured by confirming the distribution of each metal element with use of an electron probe microanalyzer (EPMA) by microscope observation of the cermet 1, determining the composition of each of the solid solution phase 2b and the second binder phase 5, and thereafter calculating the atomic ratio of the W element relative to the total amount of the metal elements for each of the solid solution phase 2b and the second binder phase 5. The measurement is made at arbitrary three or more sites and evaluated by a mean value thereof.

The configuration described above allows that the high-temperature hardness of the second binder phase 5 is high, so that, when the cermet 1 is used as a substrate of a cutting tool, the wear resistance at the cutting edge that comes to have a high temperature at the time of cutting is improved. Further, the second binder phase 5 has a higher elasticity than the composite carbonitride of W and Co, so that, when a shock is applied to the cermet 1, the second binder phase 5 can absorb the shock by being elastically deformed. For this reason, the fracture resistance of the cermet 1 can be enhanced. Also, since the first binder phase 4 has a high wettability to the hard phase 2, development of cracks is decreased, thereby enhancing the fracture resistance of the cermet 1 in this respect as well.

When the cermet 1 has a high strength at a high temperature, for example, when the three-point bending strength at 800° C. is 1700 MPa or more, the wear resistance at the cutting edge that comes to have a high temperature at the time of cutting is improved when the cermet 1 is used as a substrate of a cutting tool.

Further, when the three-point bending strength at 800° C. is 65% or more of the three-point bending strength at room temperature (25° C.), the wear resistance at the cutting edge that comes to have a high temperature at the time of cutting is improved as well when the cermet 1 is used as a substrate of a cutting tool.

Here, the three-point bending strength at room temperature and at 800° C. is measured in accordance with ISO 14704 (JIS R1601) and ISO 17565 (JIS R1604). Here, when the shape of a sample is not large enough to prepare a test piece having a predetermined size, the measurement is made by reducing the size of the test piece while maintaining the dimension ratio of the test piece. At this time, the three-point bending strength tends to increase according as the size of the test piece is reduced. For this reason, an absolute value of the three-point bending strength of the cermet 1 in a size that accords to ISO 14704 and ISO 17565 can be estimated by preparing both a test piece having a size that accords to ISO 14704 and ISO 17565 and a test piece having the same size as the cermet 1 with use of a material similar to that of the cermet 1, measuring the three-point bending strength for both of the test pieces, and calculating the ratio of the three-point bending strength of both of the test pieces.

Further, the solid solution phase 2b includes a site where an atomic ratio of Ti in a region adjacent to the second binder phase 5 among the outer peripheries of the solid solution phase 2b is higher than a mean value of an atomic ratio of Ti of the solid solution phase 2b. This allows that a compression stress can be imparted to the solid solution phase 2b, so that the toughness of the cermet 1 is furthermore improved.

Here, the atomic ratio of Ti in a region adjacent to the second binder phase 5 among the outer peripheries of the solid solution phase 2b is defined as follows. That is, from an arbitrary position that is adjacent to the second binder phase 5 among the outer peripheral ends of the solid solution phase 2b, the longest straight line that can be drawn into the solid solution phase 2b is drawn, and the atomic ratio of Ti at the length position (depth) of 10% of the length of the straight line from the aforementioned arbitrary position is defined as the atomic ratio of Ti in the region adjacent to the second binder phase 5. Here, regarding the solid solution phase 2b, the atomic ratio of Ti need not necessarily be higher in all the regions adjacent to the second binder phase 5 among the outer peripheries of the solid solution phase 2b than the mean value of the atomic ratio of Ti of the solid solution phase 2b. Also, it is sufficient that, in an arbitrary region of 50 μm square, there is at least one solid solution phase 2b including a site where the atomic ratio of Ti in a region adjacent to the second binder phase 5 among the outer peripheries of the solid solution phase 2b is higher than the mean value of the atomic ratio of Ti of the solid solution phase 2b.

Here, the atomic ratio of Ti at a site adjacent to the first binder phase 4 among the outer peripheries of the solid solution phase 2b may also be higher than the mean value of the atomic ratio of Ti of the solid solution phase 2b.

Furthermore, the TiCN phase 2a includes a site where an atomic ratio of Ti in a region adjacent to the second binder phase 5 among the outer peripheries of the TiCN phase 2a is lower than an atomic ratio of Ti at the center of the TiCN phase 2a. This allows that the adhesion between the second binder phase 5 and the TiCN phase 2a is improved, so that the strength of the cermet 1 is furthermore improved.

Here, the atomic ratio of Ti in a region adjacent to the second binder phase 5 among the outer peripheries of the TiCN phase 2a is defined as follows. That is, from an arbitrary position that is adjacent to the second binder phase 5 among the outer peripheral ends of the TiCN phase 2a, the longest straight line that can be drawn into the TiCN phase 2a is drawn, and the atomic ratio of Ti at the length position (depth) of 10% of the length of the straight line from the aforementioned arbitrary position is defined as the atomic ratio of Ti in the region adjacent to the second binder phase 5. Here, regarding the TiCN phase 2a, the atomic ratio of Ti need not necessarily be lower in all the regions adjacent to the second binder phase 5 among the outer peripheries of the TiCN phase 2a than the atomic ratio of Ti at the center of the TiCN phase 2a. Also, regarding the TiCN phase 2a including a site where the atomic ratio of Ti in a region adjacent to the second binder phase 5 among the outer peripheries of the TiCN phase 2a is lower than the atomic ratio of Ti at the center of the TiCN phase 2a, it is sufficient that at least one TiCN phase 2a has the aforementioned composition in an arbitrary region of 50 μm square.

Here, the atomic ratio of Ti of the TiCN phase 2a adjacent to the second binder phase 5 may decrease along the direction towards the outer peripheries, and also the atomic ratio of Ti of the TiCN phase 2a adjacent to the first binder phase 4 may decrease along the direction towards the outer peripheries.

The mean value of the atomic ratio of each element in the solid solution phase 2b is measured by the following method. First, the center of the solid solution phase 2b is determined. The center of the solid solution phase 2b is defined to be a middle position of the longest line segment that can be drawn in the solid solution phase 2b. A straight line passing through the center of the solid solution phase 2b and reaching both of the outer peripheral ends of the solid solution phase 2b is drawn, and the state of distribution of W and Ti on this straight line is measured by EPMA. A mean value of the atomic ratio of W and Ti on this straight line is determined as the mean value of the atomic ratio of W and Ti in the solid solution phase 2b.

In the present embodiment, the mean particle size $d_a$ of the TiCN phase 2a is 0.05 to 0.5 μm, and the mean particle size $d_b$ of the solid solution phase 2b is 0.5 to 2 μm, so that the mean particle size $d_b$ of the solid solution phase 2b is larger than the mean particle size $d_a$ of the TiCN phase 2a. The particle size ratio ($d_b/d_a$) is 3.0 to 10. This allows that the fracture resistance can be improved without deteriorating the wear resistance of the cermet 1. The area ratio Sa of the TiCN phase 2a in a microscope photograph is 20 to 35% by area in terms of the area ratio relative to the whole of the field of view, and the area ratio Sb of the solid solution phase 2b in a microscope photograph is 35 to 50% by area in terms of the area ratio relative to the whole of the field of view. Within this range, the fracture resistance can be enhanced without deteriorating the wear resistance of the cermet 1.

Figure 2:
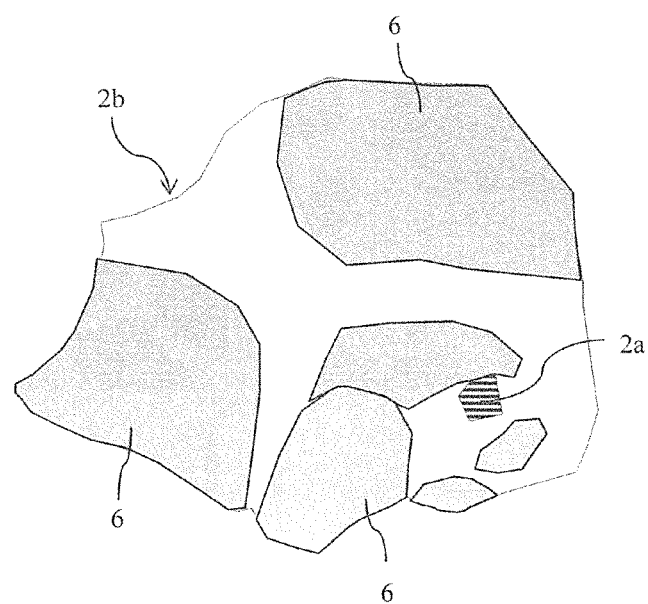
FIG. 2 is a schematic view showing one of the solid solution phases in the cermet of FIG. 1 by enlargement.

Here, FIG. 2 shows a schematic view in which one of the solid solution phases 2b is shown by enlargement in the schematic view of FIG. 1. In the present embodiment, the cermet 1 may have a structure such that the solid solution phase 2b contains W, and the solid solution phase 2b containing W contains a plurality of fine particles with a differing mass ratio of W relative to a total amount of metal elements, in the solid solution phase 2b. This solid solution phase 2b containing fine particles in the inside thereof can be confirmed by confirming the state of distribution of the metal elements constituting the solid solution phase 2b by microscope observation. This configuration allows that a larger compression stress can be imparted into the cermet 1, so that the fracture resistance of the cermet 1 can be enhanced. A preferable range of the area ratio of the solid solution phase 2b composed of an assembly of fine particles relative to the whole of the solid solution phase 2b may be 50 to 100% by area.

Here, the distinction between the hard phase 2 and the binder phase 3 can be made by confirming the state of distribution and the content ratio of each element with use of an electron probe microanalyzer (EPMA) or by Auger analysis. Also, the measurement of the particle size of the hard phase 2 is made in accordance with the method of measuring the mean particle size of cemented carbide as defined in CIS-019D-2005. At this time, the particle size of the solid solution phase 2b having a core-containing structure is calculated by overlooking the presence of the TiCN phase 2a constituting the core part.

In the present embodiment, the carbon content in the cermet 1 is 6.00% by mass to 8.00% by mass. Within this range, both the wear resistance and the fracture resistance of the cermet 1 are high. The carbon content in the cermet 1 can be measured by pulverizing a part of the structure obtained by polishing and removing 500 μm or more from the surface of the cermet 1 and performing carbon analysis, because an alteration phase having a different composition from that of the inside of the cermet 1 may possibly be present on the surface of the cermet 1. A particularly suitable range of the carbon content may be 6.00% by mass to 7.50% by mass, and a particularly preferable range may be 6.50% by mass to 7.00% by mass. Within this range, the wear resistance of the cermet 1 can be furthermore enhanced. Further, the nitrogen content in the cermet 1 is 5.0% by mass to 7.5% by mass. A preferable range of the nitrogen content may be 6.2% by mass to 7.2% by mass. The nitrogen content in the cermet 1 can be analyzed by the same method as the method of analyzing the carbon content. A preferable range of the CN ratio, which is a ratio of nitrogen content/(carbon content+nitrogen content), may be 0.42 to 0.53. Within this range, a good balance is provided between the fracture resistance and the wear resistance of the cermet 1.

Also, in the present embodiment, the content of each metal element relative to the total amount of the metal elements contained in the cermet 1 is such that Ti is contained at 30 to 55% by mass, W at 10 to 30% by mass, Nb at 0 to 20% by mass, Mo at 0 to 10% by mass, Ta at 0 to 10% by mass, V at 0 to 5% by mass, Zr at 0 to 5% by mass, Co at 5 to 25% by mass, and Ni at 0 to 15% by mass. Within this composition range, the cermet 1 has a high wear resistance and a high fracture resistance.

The cermet 1 may further contain a Mn component. This produces an effect of decreasing grain growth of the hard phase 2, whereby the hardness and the strength of the cermet 1 are improved. Part of the Mn component that is added as a raw material may be volatilized during the sintering, so that the content of Mn contained in the cermet 1 is smaller than the content of the Mn component that is added into the raw material. The Mn content relative to the total amount of the metal elements contained in the cermet 1 is 0.01% by mass to 0.5% by mass.

When the Mn component is contained in a larger amount in the second binder phase 5 than in the hard phase 2 in the cermet 1, it produces an effect of decreasing grain growth of the hard phase 2. Further, the ratio of the content of Mn contained in the hard phase 2 to the content of Mn contained in the first binder phase 4 is 0.7 to 1.5.

Here, the atomic ratio of Mn of the solid solution phase 2b, the first binder phase 4, and the second binder phase 5 can be measured by confirming the distribution of each metal element with use of an electron probe microanalyzer (EPMA) by microscope observation of the cermet 1, determining the mean composition of each of the solid solution phase 2b and the second binder phase 5, and thereafter calculating the atomic ratio of the Mn element relative to the total amount of the metal elements.

A cutting tool according to the present embodiment comprises the cermet described above as a substrate. Since the cermet has a high heat dissipation property, a high shock resistance, and a high fracture resistance, the cutting tool also has a high wear resistance and a high fracture resistance. Here, the cutting tool may be produced by using the cermet described above as a substrate and providing a covering layer such as a TiN layer or a TiAlN layer on the surface thereof.

(Manufacturing Method)

Next, a method for manufacturing the cermet and the cutting tool described above will be described.

First, a mixed powder is prepared by mixing TiCN powder having a mean particle size of 0.1 to 1.2 μm, particularly 0.3 to 0.9 μm, WC powder having a mean particle size of 0.1 to 2.5 μm, at least one kind of powder selected from carbide powder, nitride powder and carbonitride powder of Group 4, Group 5, and Group 6 metals of the periodic table other than TiCN and WC, a predetermined amount of metal Co powder and metal Ni powder having a mean particle size of 0.5 to 5 μm, 1 to 20% by mass of at least one kind of powder selected from metal W powder and $WC_{1-x}$ ($0<x \leq 1$) powder having a mean particle size of 3 to 15 μm, and optionally carbon powder such as carbon black. Further, a predetermined amount of MnC powder having a mean particle size of 0.5 to 5 μm may be added into the mixed powder.

In the present embodiment, TiN powder, WC powder, NbC powder, MoC powder, TaC powder, VC powder, and ZrC powder having a mean particle size of 0.1 to 3 μm can be applied as the aforesaid at least one kind of powder selected from carbide powder, nitride powder and carbonitride powder of Group 4, Group 5, and Group 6 metals of the periodic table other than TiCN.

Preparation of the mixed powder is carried out by adding a binder, a solvent, and the like into the aforementioned raw material powder and mixing the resultant by a known mixing method such as a ball mill, a vibration mill, a jet mill, or an attritor mill. When powder mixing by an attritor mill is carried out, the raw material powder is usually ground to have a small particle size; however, since metal powder has a high ductility, the raw material powder is less likely to be ground. Further, this mixed powder is formed into a molded body having a predetermined shape by a known molding method such as press molding, extrusion molding, or injection molding.

Subsequently, according to the present embodiment, the aforementioned molded body is sintered under vacuum or in an inert gas atmosphere. According to the present embodiment, the cermet having the predetermined structure described above can be prepared by performing sintering under the following conditions. Specific sintering conditions are as follows: (a) the temperature is increased from room temperature to 1100° C.; (b) the temperature is increased under vacuum at a temperature rising rate a of 0.1 to 2° C./min from 1100° C. to a sintering temperature $T_1$ of 1330 to 1380° C.; (c) the temperature is increased under vacuum or in an inert gas atmosphere of 30 to 2000 Pa at a temperature rising rate b of 4 to 15° C./min from the sintering temperature $T_1$ to a sintering temperature $T_2$ of 1500 to 1600° C.; (d) the sintering temperature $T_2$ is retained for 0.5 to 2 hours under vacuum or in an inert gas atmosphere of 30 to 2000 Pa; and thereafter (e) the temperature is decreased at a temperature lowering rate e of 5 to 15° C./min.

By adjusting the mean particle size of the WC powder and the metal W powder in the above raw material powder and controlling the temperature-increasing pattern and the timing of introducing the predetermined amount of the inert gas in the above sintering process, the Co powder and the Ni powder are dissolved into each other to form a solid solution and turn around into the surroundings of the hard phase so as to bond the hard phases with each other. Further, while a part of the aforesaid at least one kind of powder selected from metal W powder and $WC_{1-x}$ (0<x≤1) powder that is present in a state of having a mean particle size larger than that of the other constituents of the raw material powder in the molded body is diffused into the hard phase by the sintering process, a part thereof forms a second binder phase. As a result of this, the cermet 1 having the structure described above can be prepared.

In other words, when the temperature rising rate in the (b) step is lower than 0.1° C./min, the sintering time will be too long to be practical, while when the temperature rising rate in the (b) step is higher than 2° C./rain, voids are liable to be generated on the surface of the cermet 1. Further, when the temperature rising rate in the (c) step is lower than 4° C./rain, both the first binder phase and the second binder phase can hardly exist. When the temperature rising rate in the (c) step is higher than 15° C./min, voids are liable to be generated on the surface of the cermet 1. When the sintering temperature $T_2$ is lower than 1500° C., the sinterability becomes insufficient, whereas when the sintering temperature $T_2$ is higher than 1600° C., both the first binder phase and the second binder phase can hardly exist. When the temperature lowering rate in the (e) step is lower than 5° C./rain and particularly when a $CH_4$ gas is mixed as an inert gas in the (c) and (d) steps, the second binder phase is not formed, and a composite carbonitride containing W and Co is liable to be formed. When the temperature lowering rate in the (e) step is higher than 15° C./min, cracks are liable to be generated on the surface of the cermet.

Subsequently, a film of a coating layer is formed, as desired, on the surface of the cermet, thereby to prepare a cutting tool. As a method of forming the film of the coating layer, a physical vapor deposition (PVD) method such as the ion plating method or the sputtering method can be suitably applied.

EXAMPLES

TiCN powder having a mean particle size of 0.6 μm, WC powder having a mean particle size of 1.1 μm, TiN powder having a mean particle size of 1.5 μm, TaC powder having a mean particle size of 2 μm, NbC powder having a mean particle size of 1.5 μm, MoC powder having a mean particle size of 2.0 μm, ZrC powder having a mean particle size of 1.8 μm, VC powder having a mean particle size of 1.0 μm, MnC powder having a mean particle size of 3.0 μm, Ni powder having a mean particle size of 2.4 μm, Co powder having a mean particle size of 1.9 μm, and W powder and/or $WC_{0.5}$ powder having a mean particle size shown in Table 1 (the W powder and the $WC_{0.5}$ powder are denoted as W and $WC_{0.5}$, respectively, in the Table) were prepared. These mean particle sizes were measured by the microtrack method. A mixed powder obtained by preparing these raw material powders at ratios shown in Table 1 and adding carbon black so that the carbon content in the cermet after sintering would have a value shown in Table 2 was wet mixed in isopropyl alcohol (IPA) by using a ball mill made of stainless steel and carbide balls, followed by adding 3% by mass of paraffin and mixing with an attritor mill. Thereafter, with use of granulated powder that had been granulated by spray drying, the obtained mixture was press-molded into a cutting tool (throw-away tip) shape of CNMG120408 at 150 MPa.

Further, the resultant was sintered under the sintering conditions such that: (a) the temperature was increased from room temperature to 1100° C.; (b) the temperature was increased under vacuum at a temperature rising rate a of 0.7° C./min from 1100° C. to 1350° C.; (c) the temperature was increased in a $N_2$ gas atmosphere of 1000 Pa at a temperature rising rate b (which is denoted as speed b in Table 1) from the sintering temperature of 1350° C. to a sintering temperature $T_2$ shown in Table 1; (d) the sintering temperature $T_2$ was retained for one hour in a $N_2$ gas atmosphere of 1000 Pa; and thereafter (e) the temperature was decreased at a temperature lowering rate e shown in Table 1 (which is denoted as speed e in Table 1). Here, with respect to Sample Nos. 14 and 15, the sintering was carried out in an atmosphere in which a part of the $N_2$ gas had been replaced with a $CH_4$ gas in the (c) and (d) steps.

TABLE 1

| | Raw material composition (% by mass) | | | | | | | | | | | W Mean particle size (μm) | % by mass | Sintering condition | | | |
|---|---|---|---|---|---|---|---|---|---|---|---|---|---|---|---|---|---|
| Sample No. | TiCN | WC | TiN | TaC | MoC | NbC | ZrC | VC | MnC | Ni | Co | Type | | | $T_2$ (° C.) | Speed b (° C./minute) | Pressure P2 (Pa) | Speed e (° C./minute) |
| 1 | 33 | 9 | 9 | 2 | 2 | 10 | 1 | 0 | 0 | 10 | 15 | W | 8 | 9 | 1550 | 9 | 1000 | 11 |
| 2 | 50 | 8 | 12 | 1 | 0 | 9 | 2 | 1 | 0 | 8 | 8 | $WC_{0.5}$ | 3 | 1 | 1550 | 15 | 1000 | 15 |
| 3 | 35.0 | 22 | 9 | 1 | 1 | 5 | 2 | 1 | 0 | 8 | 12 | W | 6 | 4 | 1550 | 7 | 1000 | 8 |
| 4 | 35.0 | 15 | 11 | 0 | 0 | 11 | 1 | 1 | 0 | 10 | 10 | W | 7 | 6 | 1575 | 8 | 1000 | 10 |
| 5 | 48.0 | 10 | 10 | 3 | 0 | 6 | 1 | 0 | 0 | 8 | 10 | W | 6 | 4 | 1525 | 10 | 1000 | 7 |
| 6 | 49.0 | 10 | 3 | 1 | 1 | 11 | 0 | 2 | 0 | 8 | 10 | W | 8 | 5 | 1550 | 6 | 1000 | 13 |
| 7 | 49.0 | 10 | 7 | 2 | 0 | 10 | 0 | 1 | 0 | 0 | 18 | W | 10 | 2 | 1575 | 4 | 1000 | 5 |
| | | | | | | | | | | | | $WC_{0.5}$ | 3 | 1 | | | | |
| 8 | 43.0 | 13 | 11 | 0 | 0 | 11 | 0.5 | 1.5 | 0 | 10 | 10 | — | | | 1575 | 8 | 1000 | 10 |
| 9 | 52.0 | 14 | 10 | 1 | 0 | 8 | 0.5 | 2 | 0 | 4 | 8 | W | 6 | 0.5 | 1550 | 7 | 1000 | 12 |
| 10 | 43.0 | 13 | 10 | 1 | 1 | 9 | 1 | 1 | 0 | 8 | 10 | W | 2 | 3 | 1525 | 8 | 1000 | 8 |
| 11 | 43.0 | 13 | 10 | 1 | 1 | 9 | 1 | 1 | 0 | 8 | 10 | W | 6 | 3 | 1550 | 3 | 1000 | 10 |

TABLE 1-continued

| | Raw material composition (% by mass) | | | | | | | | | | | | W Mean particle size (μm) | % by mass | Sintering condition | | | |
|---|---|---|---|---|---|---|---|---|---|---|---|---|---|---|---|---|---|---|
| Sample No. | TiCN | WC | TiN | TaC | MoC | NbC | ZrC | VC | MnC | Ni | Co | Type | | | $T_2$ (° C.) | Speed b (° C./ minute) | Pressure P2 (Pa) | Speed e (° C./ minute) |
| 12 | 43.0 | 13 | 10 | 1 | 1 | 9 | 1 | 1 | 0 | 8 | 10 | W | 6 | 3 | 1575 | 17 | 1000 | 10 |
| 13 | 43.0 | 13 | 10 | 1 | 1 | 9 | 1 | 1 | 0 | 8 | 10 | W | 6 | 3 | 1650 | 10 | 1000 | 12 |
| 14 | 43.0 | 13 | 10 | 1 | 1 | 9 | 1 | 1 | 0 | 8 | 10 | W | 6 | 3 | 1600 | 7 | 1000 | 3 |
| 15 | 43.0 | 13 | 10 | 1 | 1 | 9 | 1 | 1 | 0 | 8 | 10 | W | 6 | 3 | 1550 | 5 | 1000 | 20 |
| 16 | 34.4 | 15 | 11 | 0 | 0 | 11 | 1 | 1 | 0.6 | 10 | 10 | W | 7 | 6 | 1575 | 8 | 1000 | 10 |
| 17 | 34.2 | 15 | 11 | 0 | 0 | 11 | 1 | 1 | 0.8 | 10 | 10 | W | 7 | 6 | 1575 | 8 | 1000 | 10 |
| 18 | 33.8 | 15 | 11 | 0 | 0 | 11 | 1 | 1 | 1.2 | 10 | 10 | W | 7 | 6 | 1575 | 8 | 1000 | 10 |
| 19 | 50 | 8 | 12 | 1 | 0 | 9 | 2 | 1 | 0 | 8 | 8 | $WC_{0.5}$ | 3 | 1 | 1550 | 4 | 1000 | 5 |
| 20 | 39.5 | 11 | 11 | 1 | 0 | 15 | 0.5 | 1 | 0 | 5 | 10 | W | 7 | 6 | 1575 | 8 | 100 | 4 |
| 21 | 39 | 11 | 10 | 1 | 1 | 9 | 0 | 1 | 0 | 12 | 10 | W | 7 | 6 | 1575 | 8 | 50 | 10 |
| 22 | 36 | 12 | 11 | 1 | 1 | 13 | 1 | 1 | 0 | 10 | 8 | W | 7 | 6 | 1575 | 8 | 70 | 10 |
| 23 | 44 | 12 | 10 | 1 | 0 | 9 | 1 | 1 | 0 | 8 | 8 | W | 7 | 6 | 1575 | 8 | 200 | 10 |
| 24 | 35.0 | 15 | 11 | 0 | 0 | 11 | 1 | 1 | 0 | 10 | 10 | W | 7 | 6 | 1575 | 8 | 1000 | 10 |
| 25 | 35.0 | 15 | 11 | 0 | 0 | 11 | 1 | 1 | 0 | 10 | 10 | W | 7 | 6 | 1575 | 8 | 1000 | 10 |
| 26 | 35.0 | 15 | 11 | 0 | 0 | 11 | 1 | 1 | 0 | 10 | 10 | W | 7 | 6 | 1575 | 8 | 1000 | 10 |
| 27 | 35.0 | 15 | 11 | 0 | 0 | 11 | 1 | 1 | 0 | 10 | 10 | W | 7 | 6 | 1575 | 8 | 1000 | 10 |

With respect to the obtained cutting tools, the composition of the metal elements contained in the cermet was analyzed by ICP analysis, so as to calculate the content of each metal element relative to the total amount of the metal elements. Also, with use of a carbon nitrogen analysis apparatus, the carbon content and the nitrogen content at a central part of the cermet obtained by polishing the surface of the cermet to a depth of 500 μm or more were measured by using a cermet with known carbon content and nitrogen content as a standard sample, and the ratio of nitrogen content/(carbon content+nitrogen content) was calculated as a CN ratio. The result is shown in Table 2.

Further, by performing transmission electron microscope (TEM) observation, the structure of the cermet was confirmed, and the types of the hard phase and the binder phase were specified in a photograph taken at a magnification of 50000 with use of an electron probe microanalyzer (EPMA), so as to confirm the presence or absence of the TiCN phase, the solid solution phase, the first binder phase, and the second binder phase and whether or not the solid solution phase contains a plurality of fine particles with a differing mass ratio of W relative to the total amount of the metal elements. The results are shown in Tables 3 and 4. Regarding the Sample Nos. 1 to 7 and 16 to 27, the first binder phase and the second binder phase were present each at three or more sites. Furthermore, mean values of the atomic ratio of W and the atomic ratio of Ti in the first binder phase, the second binder phase, the TiCN phase, and the solid solution phase were determined, and also the atomic ratio of Ti in the outer peripheries of the solid solution phase and the TiCN phase adjacent to the second binder phase was measured (which is denoted as Ti outer periphery in the Table) and compared with a mean value of the atomic ratio of Ti in the solid solution phase (which is denoted as Ti mean in the Table). The result is shown in Table 3. Here, when composition analysis was carried out at the center of the TiCN phase, the atomic ratio of Ti relative to the total amount of the metal elements was 97% by atom or more. Also, the Mn content in the solid solution phase, the first binder phase, and the second binder phase is shown in Table 4.

Also, it has been found out that a core-containing structure phase is present at a ratio of 10% by area or less relative to the whole of the hard phase and that, when there is a solid solution phase containing a plurality of fine particles with a differing mass ratio of W, the area ratio of the solid solution phases containing fine particles relative to the whole of the solid solution phases is 50% by area or more. Further, image analysis was carried out in a region of 2500 nm×2000 nm by using commercially available image analysis software, and a mean area ratio s1 of the first binder phase, a mean area ratio s2 of the second binder phase, a total area ratio S1 of the first binder phase, a total area ratio S2 of the second binder phase, and a total area ratio of the other phases (which is denoted as others) in the field of view were confirmed. The ratio of s2/s1 and the ratio of S2/S1 are shown in the Table. Also, the area ratio of a sum of S1 and S2 relative to the whole of the binder phase (which is denoted as S1+S2 ratio in the Table) was calculated. Regarding the hard phase, mean particle sizes (da, db) of the TiCN phase and the solid solution phase as well as the ratio db/da thereof, and the area ratio Sa of the TiCN phase and the area ratio Sb of the solid solution phase in the field of view were measured. Furthermore, in accordance with ISO14704 and ISO17565, the three-point bending strength at room temperature and at 800° C. was measured. The results are shown in Tables 4 and 5.

Next, the obtained cutting tools were subjected to a cutting test under the following cutting conditions. The results are shown together in Table 5.
(Wear Resistance Test)
  Workpiece: SCM435
  Cutting speed: 200 m/min
  Feed rate: 0.2 mm/rev
  Depth of cut: 2.0 mm
  Cutting state: Wet
  Evaluation method: Flank surface wear width (mm) at the time point at which the workpiece has been cut for a cutting length of 10 m
(Fracture Resistance Test)
  Workpiece: S45C
  Cutting speed: 100 m/min
  Feed rate: 0.1 to 0.5 mm/rev (+0.05 mm/rev each feeding for 10 seconds)
  Depth of cut: 2.0 mm
  Cutting state: Dry
  Evaluation method: Cutting time (sec) until the fracture occurs

TABLE 2

| Sample No. | Cermet composition (% by mass) |||||||||| Carbon content (% by mass) | Nitorogen content (% by mass) | Ratio C/N |
| --- | --- | --- | --- | --- | --- | --- | --- | --- | --- | --- | --- | --- | --- |
| | Content of metal element |||||||||| | | |
| | Ti | W | Ta | Mo | Nb | Zr | V | Mn | Ni | Co | | | |
| 1 | residue | 20.73 | 2.23 | 2.11 | 10.52 | 1.05 | 0.00 | 0.00 | 11.88 | 17.82 | 6.10 | 6.01 | 0.50 |
| 2 | residue | 10.92 | 1.21 | 0.00 | 10.26 | 2.28 | 1.04 | 0.00 | 10.30 | 10.30 | 6.50 | 5.91 | 0.48 |
| 3 | residue | 29.65 | 1.13 | 1.07 | 5.33 | 2.13 | 0.97 | 0.00 | 9.62 | 14.44 | 6.20 | 6.66 | 0.52 |
| 4 | residue | 24.28 | 0.00 | 0.00 | 11.78 | 1.07 | 0.98 | 0.00 | 12.09 | 12.09 | 6.15 | 6.43 | 0.51 |
| 5 | residue | 16.89 | 3.55 | 0.00 | 6.71 | 1.12 | 0.00 | 0.00 | 10.10 | 12.62 | 6.30 | 6.20 | 0.50 |
| 6 | residue | 18.06 | 1.18 | 1.12 | 12.23 | 0.00 | 2.03 | 0.00 | 10.04 | 12.56 | 6.25 | 6.01 | 0.49 |
| 7 | residue | 15.63 | 2.37 | 0.00 | 11.20 | 0.00 | 1.02 | 0.00 | 0.00 | 22.77 | 6.45 | 5.91 | 0.48 |
| 8 | residue | 15.26 | 0.00 | 0.00 | 12.18 | 0.55 | 1.52 | 0.00 | 12.50 | 12.50 | 6.70 | 6.38 | 0.49 |
| 9 | residue | 17.68 | 1.22 | 0.00 | 9.18 | 0.57 | 2.10 | 0.00 | 5.18 | 10.37 | 6.45 | 6.15 | 0.49 |
| 10 | residue | 18.93 | 1.17 | 1.11 | 9.93 | 1.10 | 1.01 | 0.00 | 9.96 | 12.45 | 6.50 | 6.58 | 0.50 |
| 11 | residue | 18.93 | 1.17 | 1.11 | 9.93 | 1.10 | 1.01 | 0.00 | 9.96 | 12.45 | 6.20 | 7.40 | 0.54 |
| 12 | residue | 18.93 | 1.17 | 1.11 | 9.93 | 1.10 | 1.01 | 0.00 | 9.96 | 12.45 | 6.25 | 5.86 | 0.48 |
| 13 | residue | 18.93 | 1.17 | 1.11 | 9.93 | 1.10 | 1.01 | 0.00 | 9.96 | 12.45 | 6.20 | 4.56 | 0.42 |
| 14 | residue | 18.93 | 1.17 | 1.11 | 9.93 | 1.10 | 1.01 | 0.00 | 9.96 | 12.45 | 6.25 | 8.13 | 0.57 |
| 15 | residue | 18.93 | 1.17 | 1.11 | 9.93 | 1.10 | 1.01 | 0.00 | 9.96 | 12.45 | 6.30 | 4.51 | 0.42 |
| 16 | residue | 23.95 | 0.00 | 0.00 | 12.54 | 1.14 | 0.92 | 0.09 | 11.40 | 11.40 | 6.15 | 6.15 | 0.50 |
| 17 | residue | 23.93 | 0.00 | 0.00 | 12.53 | 1.14 | 0.92 | 0.12 | 11.39 | 11.39 | 6.15 | 6.15 | 0.50 |
| 18 | residue | 23.89 | 0.00 | 0.00 | 12.51 | 1.14 | 0.92 | 0.19 | 11.37 | 11.37 | 6.15 | 6.24 | 0.50 |
| 19 | residue | 10.92 | 1.21 | 0.00 | 10.26 | 2.28 | 1.04 | 0.00 | 10.30 | 10.30 | 6.50 | 6.12 | 0.48 |
| 20 | residue | 20.18 | 1.16 | 0.00 | 16.42 | 0.55 | 1.00 | 0.00 | 6.18 | 12.36 | 6.35 | 4.50 | 0.41 |
| 21 | residue | 19.92 | 1.14 | 1.08 | 9.73 | 0.00 | 0.99 | 0.00 | 14.64 | 12.20 | 6.50 | 7.76 | 0.54 |
| 22 | residue | 21.02 | 1.14 | 1.08 | 14.02 | 1.08 | 0.99 | 0.00 | 12.18 | 9.74 | 6.45 | 7.86 | 0.55 |
| 23 | residue | 21.55 | 1.17 | 0.00 | 9.95 | 1.10 | 1.01 | 0.00 | 9.99 | 9.99 | 6.40 | 4.50 | 0.41 |
| 24 | residue | 24.28 | 0.00 | 0.00 | 11.78 | 1.07 | 0.98 | 0.00 | 12.09 | 12.09 | 6.65 | 6.95 | 0.51 |
| 25 | residue | 24.28 | 0.00 | 0.00 | 11.78 | 1.07 | 0.98 | 0.00 | 12.09 | 12.09 | 7.20 | 7.01 | 0.49 |
| 26 | residue | 24.28 | 0.00 | 0.00 | 11.78 | 1.07 | 0.98 | 0.00 | 12.09 | 12.09 | 8.10 | 5.65 | 0.41 |
| 27 | residue | 24.28 | 0.00 | 0.00 | 11.78 | 1.07 | 0.98 | 0.00 | 12.09 | 12.09 | 5.90 | 6.85 | 0.54 |

TABLE 3

| Sample No. | Cermet structure (% by atom) |||||||||| 
| --- | --- | --- | --- | --- | --- | --- | --- | --- | --- | --- |
| | First binder phase ||| Second binder phase ||| TiCN phase | Solid solution phase |||
| | W | Co + Ni | W/(Co + Ni) | W | Co + Ni | W/(Co + Ni) | Ti outer periphery | W | Ti mean | Ti outer periphery |
| 1 | 12.2 | 78.7 | 0.16 | 55.3 | 36.1 | 1.53 | 85.5 | 20.5 | 52.5 | 72.2 |
| 2 | 38.7 | 50.5 | 0.77 | 60.8 | 30.0 | 2.03 | 95.6 | 39.1 | 40.3 | 40.3 |
| 3 | 10.7 | 80.2 | 0.13 | 52.9 | 36.8 | 1.33 | 80.3 | 13.9 | 43.8 | 82.7 |
| 4 | 13.5 | 79.1 | 0.17 | 55.2 | 34.2 | 1.61 | 78.2 | 14.1 | 47.4 | 75.3 |
| 5 | 22.9 | 67.6 | 0.34 | 51.7 | 39.0 | 1.44 | 90.4 | 28.4 | 50.5 | 68.2 |
| 6 | 15.5 | 74.3 | 0.21 | 55.4 | 35.2 | 1.57 | 81.1 | 16.6 | 49.2 | 72.8 |
| 7 | 28.6 | 60.9 | 0.47 | 49.4 | 41.2 | 1.20 | 74.7 | 30.8 | 47.2 | 73.8 |
| 8 | 15.3 | 73.8 | 0.21 | — | — | — | 82.1 | 13.5 | 59.5 | 59.5 |
| 9 | 14.8 | 72.8 | 0.20 | — | — | — | 88.3 | 13.2 | 58.2 | 58.2 |
| 10 | 15.2 | 73.4 | 0.21 | — | — | — | 97.2 | 13.3 | 60.2 | 60.8 |
| 11 | 14.3 | 72.9 | 0.20 | — | — | — | 78.8 | 13.5 | 60.4 | 60.9 |
| 12 | | | | Generated voids |||||||
| 13 | 16.2 | 74.1 | 0.22 | — | — | — | 88.2 | 13.5 | 50.8 | 50.8 |
| 14 | 15.3 | 75.2 | 0.20 | — | — | — | 82.2 | 14.1 | 58.7 | 58.7 |
| 15 | | | | Generated cracks |||||||
| 16 | 13.4 | 79.9 | 0.17 | 55.1 | 34.1 | 1.62 | 78.3 | 14.2 | 47.3 | 75.6 |
| 17 | 13.3 | 80.1 | 0.17 | 55.0 | 34.2 | 1.61 | 78.4 | 14.2 | 46.2 | 72.3 |
| 18 | 13.2 | 80.4 | 0.16 | 55.1 | 34.3 | 1.61 | 78.1 | 14.1 | 50.4 | 70.3 |
| 19 | 13.0 | 79.1 | 0.16 | 55.4 | 34.0 | 1.63 | 78.1 | 12.8 | 67.4 | 65.0 |
| 20 | 13.4 | 78.6 | 0.17 | 50.9 | 36.8 | 1.38 | 80.3 | 42.2 | 68.5 | 55.6 |
| 21 | 11.7 | 75.4 | 0.16 | 51.2 | 35.4 | 1.45 | 78.1 | 10.5 | 54.8 | 54.8 |
| 22 | 12.8 | 69.8 | 0.18 | 52.1 | 36.2 | 1.44 | 79.7 | 12.8 | 65.8 | 65.3 |
| 23 | 12.4 | 73.6 | 0.17 | 49.3 | 37.3 | 1.32 | 78.6 | 18.2 | 56.3 | 56.3 |
| 24 | 13.6 | 79.0 | 0.17 | 55.3 | 34.2 | 1.62 | 78.1 | 14.0 | 47.3 | 75.1 |
| 25 | 13.8 | 79.0 | 0.17 | 55.4 | 34.1 | 1.62 | 78.2 | 13.9 | 47.2 | 75.0 |
| 26 | 13.8 | 78.9 | 0.17 | 55.5 | 34.0 | 1.63 | 78.1 | 13.8 | 47.2 | 75.0 |
| 27 | 13.4 | 79.2 | 0.17 | 55.1 | 34.3 | 1.61 | 78.2 | 14.1 | 47.5 | 75.3 |

TABLE 4

| | Cermet structure | | | | | | | | | | |
|---|---|---|---|---|---|---|---|---|---|---|---|
| | Contained Mn(% by mass) | | | Mean area of binder phase | | | Total area of binder phase (% by area, ratio) | | | | |
| Sample No. | First binder phase | Second binder phase | Hard phase | (μm², ratio) | | | | | | | Ratio |
| | | | | s1 | s2 | s2/s1 | S1 | S2 | Others | S2/S1 | S1 + S2 |
| 1 | 0.0 | 0.0 | 0.0 | 0.06 | 0.10 | 1.67 | 17 | 18 | 2 | 1.06 | 0.95 |
| 2 | 0.0 | 0.0 | 0.0 | 0.06 | 0.06 | 1.00 | 17 | 2 | 2 | 0.12 | 0.90 |
| 3 | 0.0 | 0.0 | 0.0 | 0.06 | 0.08 | 1.33 | 18 | 10 | 2 | 0.56 | 0.93 |
| 4 | 0.0 | 0.0 | 0.0 | 0.07 | 0.10 | 1.43 | 20 | 9 | 2 | 0.45 | 0.94 |
| 5 | 0.0 | 0.0 | 0.0 | 0.04 | 0.06 | 1.50 | 20 | 6 | 2 | 0.30 | 0.93 |
| 6 | 0.0 | 0.0 | 0.0 | 0.07 | 0.09 | 1.29 | 18 | 9 | 3 | 0.50 | 0.90 |
| 7 | 0.0 | 0.0 | 0.0 | 0.05 | 0.11 | 2.20 | 19 | 5 | 2 | 0.26 | 0.92 |
| 8 | 0.0 | 0.0 | 0.0 | — | — | — | 25 | — | 3 | — | — |
| 9 | 0.0 | 0.0 | 0.0 | — | — | — | 19 | — | 4 | — | — |
| 10 | 0.0 | 0.0 | 0.0 | — | — | — | 21 | — | 4 | — | — |
| 11 | 0.0 | 0.0 | 0.0 | — | — | — | 21 | — | 2 | — | — |
| 12 | 0.0 | 0.0 | 0.0 | | | Generated voids | | | | | |
| 13 | 0.0 | 0.0 | 0.0 | — | — | — | 20 | — | 4 | — | — |
| 14 | 0.0 | 0.0 | 0.0 | — | — | — | 21 | — | 4 | — | — |
| 15 | 0.0 | 0.0 | 0.0 | | | Generated cracks | | | | | |
| 16 | 0.05 | 0.02 | 0.02 | 0.07 | 0.10 | 1.43 | 20 | 9 | 2 | 0.45 | 0.94 |
| 17 | 0.06 | 0.03 | 0.03 | 0.07 | 0.10 | 1.43 | 20 | 9 | 2 | 0.45 | 0.94 |
| 18 | 0.09 | 0.05 | 0.05 | 0.07 | 0.10 | 1.43 | 20 | 9 | 2 | 0.45 | 0.94 |
| 19 | 0.0 | 0.0 | 0.0 | 0.06 | 0.05 | 0.83 | 17 | 2 | 2 | 0.12 | 0.90 |
| 20 | 0.06 | 0.05 | 0.83 | 0.07 | 0.10 | 1.43 | 17 | 2 | 3 | 0.12 | 0.86 |
| 21 | 0.07 | 0.06 | 0.86 | 0.07 | 0.10 | 1.43 | 17 | 3 | 2 | 0.18 | 0.91 |
| 22 | 0.07 | 0.05 | 0.71 | 0.07 | 0.10 | 1.43 | 18 | 3 | 2 | 0.17 | 0.91 |
| 23 | 0.08 | 0.06 | 0.75 | 0.07 | 0.10 | 1.43 | 16 | 2 | 4 | 0.13 | 0.82 |
| 24 | 0.0 | 0.0 | 0.0 | 0.06 | 0.11 | 1.83 | 19 | 9 | 2 | 0.47 | 0.93 |
| 25 | 0.0 | 0.0 | 0.0 | 0.07 | 0.11 | 1.57 | 18 | 9 | 2 | 0.50 | 0.93 |
| 26 | 0.0 | 0.0 | 0.0 | 0.08 | 0.12 | 1.50 | 17 | 10 | 2 | 0.59 | 0.93 |
| 27 | 0.0 | 0.0 | 0.0 | 0.08 | 0.09 | 1.13 | 20 | 9 | 2 | 0.45 | 0.94 |

TABLE 5

| | Cermet structure | | | | | | Three-point bending strength | | Flank surface | Time until |
|---|---|---|---|---|---|---|---|---|---|---|
| | Hard phase | | | | | | | Room | wear | a fracture |
| Sample No. | da (μm) | db (μm) | db/da | Sa (% by area) | Sb (% by area) | Fine particles[1] | 800° C. (MPa) | temperature ratio | width (mm) | occurred (second) |
| 1 | 0.34 | 1.35 | 3.97 | 22 | 41 | Present | 1887 | 75 | 0.063 | 81 |
| 2 | 0.40 | 1.19 | 2.98 | 32 | 46 | Present | 1753 | 70 | 0.091 | 67 |
| 3 | 0.38 | 1.35 | 3.55 | 27 | 43 | Present | 1918 | 77 | 0.057 | 83 |
| 4 | 0.43 | 1.80 | 4.19 | 25 | 44 | Present | 1994 | 78 | 0.051 | 85 |
| 5 | 0.25 | 1.03 | 4.12 | 30 | 41 | Present | 1831 | 73 | 0.084 | 70 |
| 6 | 0.38 | 1.42 | 3.74 | 29 | 42 | Present | 1792 | 71 | 0.074 | 75 |
| 7 | 0.40 | 1.75 | 4.38 | 27 | 46 | Present | 1840 | 74 | 0.085 | 69 |
| 8 | 0.45 | 1.80 | 4.00 | 25 | 47 | Absent | 1550 | 62 | 0.121 | 55 |
| 9 | 0.28 | 1.23 | 4.39 | 32 | 45 | Present | 1483 | 59 | 0.106 | 45 |
| 10 | 0.30 | 1.04 | 3.47 | 30 | 45 | Absent | 1515 | 61 | 0.115 | 51 |
| 11 | 0.37 | 1.53 | 4.14 | 30 | 47 | Present | 1437 | 57 | 0.128 | 38 |
| 12 | | | | | | | | | | |
| 13 | 0.65 | 2.52 | 3.88 | 18 | 58 | Present | 1474 | 58 | 0.153 | 38 |
| 14 | 0.52 | 2.13 | 4.10 | 19 | 56 | Present | 1503 | 60 | 0.141 | 41 |
| 15 | | | | | | | | | | |
| 16 | 0.35 | 1.60 | 4.57 | 25 | 44 | Present | 1680 | 58 | 0.048 | 89 |
| 17 | 0.33 | 1.50 | 4.55 | 25 | 44 | Present | 1800 | 59 | 0.045 | 91 |
| 18 | 0.36 | 1.70 | 4.72 | 25 | 44 | Present | 1790 | 65 | 0.054 | 93 |
| 19 | 0.41 | 1.20 | 2.93 | 31 | 45 | Absent | 1630 | 55 | 0.097 | 65 |
| 20 | 0.40 | 1.19 | 2.98 | 31 | 47 | Present | 1732 | 69 | 0.092 | 65 |
| 21 | 0.40 | 1.19 | 2.98 | 32 | 46 | Present | 1670 | 67 | 0.094 | 62 |
| 22 | 0.40 | 1.19 | 2.98 | 31 | 46 | Present | 1680 | 68 | 0.093 | 64 |
| 23 | 0.40 | 1.19 | 2.98 | 30 | 48 | Present | 1740 | 70 | 0.090 | 68 |
| 24 | 0.43 | 1.80 | 4.19 | 25 | 44 | Present | 2000 | 79 | 0.048 | 98 |
| 25 | 0.43 | 1.80 | 4.19 | 25 | 44 | Present | 2003 | 79 | 0.049 | 96 |

TABLE 5-continued

| | Cermet structure | | | | | | Three-point bending strength | | Flank surface | Time until |
|---|---|---|---|---|---|---|---|---|---|---|
| | Hard phase | | | | | | | Room | wear | a fracture |
| Sample No. | da (μm) | db (μm) | db/da | Sa (% by area) | Sb (% by area) | Fine particles[1] | 800° C. (MPa) | temperature ratio | width (mm) | occurred (second) |
| 26 | 0.43 | 1.80 | 4.19 | 25 | 44 | Present | 1999 | 80 | 0.054 | 82 |
| 27 | 0.43 | 1.80 | 4.19 | 25 | 44 | Present | 1992 | 77 | 0.058 | 81 |

[1]Fine particles:
"Present" stands for a cermet in which a solid solution phase containing fine particles inside was seen.
"Absent" stands for a cermet in which a solid solution phase containing fine particles inside was not seen.

From Tables 1 to 5, it will be noted that the second binder phase was absent; the flank surface wear width was large; and the time until a fracture occurred was short in all of Sample No. 8 in which neither the metal W powder nor the $WC_{1-x}$ (0<x≤1) powder was added into the raw material, Sample No. 9 in which the amount of added metal W powder and $WC_{1-x}$ (0<x≤1) powder in the raw material was less than 1% by mass, Sample No. 10 in which the mean particle size of the metal W powder added into the raw material was less than 3 μm, Sample No. 11 in which the temperature rising rate in the (c) step at the time of sintering was smaller than 4° C./rain, and Sample No. 13 in which the sintering temperature $T_2$ was higher than 1600° C. Further, in Sample No. 12 in which the temperature rising rate in the (c) step was larger than 15° C./min, voids were generated on the surface of the sintered cermet, and the cutting tool could not be put into practical use. In Sample No. 14 in which the temperature lowering rate in the (e) step was smaller than 5° C./rain, the second binder phase was not formed, and a composite carbonitride containing W and Co was formed. In Sample No. 15 in which the temperature lowering rate in the (e) step was larger than 15° C./min, cracks were generated on the surface of the sintered cermet, and the cutting tool could not be put into practical use.

In contrast, it will be noted that the flank surface wear width was small, and the cutting time until a fracture occurred was long in all of Sample Nos. 1 to 7 and 16 to 27 which are cutting tools including a cermet having a structure of the present embodiment.

In Sample Nos. 1, 3 to 7, 16 to 18, and 24 to 27 in which the ratio (S2/S1) was 0.2 to 1.5, the time until a fracture occurred was long. Above all, in Sample Nos. 1 to 7, 16 to 18, and 20 to 27 in which the ratio (s2/s1) was 1.0 to 3.0, the flank surface wear width was small. Further, in Sample Nos. 1 to 7, 16 to 18, and 20 to 27 in which a structure containing fine particles was seen in the inside of the solid solution phase, the flank surface wear width was small, and also the time until a fracture occurred was long. Here, in Sample Nos. 2 and 6, other hard phases such as WC were present in the cermet structure.

Also, in all of Sample Nos. 1 to 7, 16 to 18, 20, and 22 to 27 in which the atomic ratio of W of the second binder phase was larger than the atomic ratio of W of the solid solution phase and the atomic ratio of W of the first binder phase was equal to or smaller than the atomic ratio of W of the solid solution phase, the flank surface wear width was small, and also the cutting time until a fracture occurred was long. In particular, in Sample Nos. 1, 3 to 7, 16 to 18, and 24 to 27 in which the atomic ratio of Ti in the outer peripheries of the solid solution phase adjacent to the second binder phase was larger than the mean value of the atomic ratio of Ti of this solid solution phase, the flank surface wear width was small. Furthermore, in Sample Nos. 1 to 7 and 16 to 27 in which the atomic ratio of Ti of the TiCN phase adjacent to the second binder phase was smaller in the outer peripheries, the flank surface wear width was small. Also, in all of Sample Nos. 1 to 7, 16 to 19, 24, and 25 having a carbon content of 6.00 to 8.00% by mass and a nitrogen content of 5.00 to 7.50% by mass with the CN ratio being 0.42 to 0.53, the flank surface wear width was small, and also the cutting time until a fracture occurred was long.

DESCRIPTION OF THE REFERENCE NUMERAL

1: Cermet
2: Hard phase
2a: TiCN phase
2b: Solid solution phase
3: Binder phase
4: First binder phase
5: Second binder phase

The invention claimed is:

1. A cermet, comprising:
a hard phase including a carbonitride of one or more kinds of metals selected from Group 4, Group 5, and Group 6 metals of the periodic table including at least Ti; and
a binder phase containing metal W and at least one kind of a metal selected from metal Co and metal Ni,
wherein the binder phase includes a first binder phase in which a mass ratio of metal W to a total amount of metal Co and metal Ni (W/(Co+Ni)) is 0.8 or less and a second binder phase in which a mass ratio of metal W to a total amount of metal Co and metal Ni (W/(Co+Ni)) is 1.2 or more.

2. The cermet according to claim 1, wherein, in a microscope photograph,
a ratio of a sum of a total area ratio S1 of the first binder phase and a total area ratio S2 of the second binder phase relative to a total area ratio of a whole of the binder phase is 0.9 or more, and
a ratio of the total area ratio S2 to the total area ratio S1 (S2/S1) is 0.2 to 1.5.

3. The cermet according to claim 1, wherein, in a microscope photograph,
a ratio of a mean area ratio s2 of the second binder phases to a mean area ratio s1 of the first binder phases (s2/s1) is 1.0 to 3.0.

4. The cermet according to claim 1, wherein
the hard phase includes a TiCN phase and a solid solution phase including a composite carbonitride of Ti and one or more kinds of metals selected from Group 4, Group 5, and Group 6 metals of the periodic table other than Ti.

5. The cermet according to claim 4, wherein a part or a whole of the solid solution phase contains W, and the solid solution phase containing W contains a plurality of fine particles with a differing mass ratio of W relative to a total amount of metal elements, in the solid solution phase.

6. The cermet according to claim 1, further containing Mn.

7. The cermet according to claim 1, wherein
the hard phase includes a TiCN phase and a solid solution phase including a composite carbonitride containing Ti and W;
an atomic ratio of W of the second binder phase is larger than an atomic ratio of W of the solid solution phase; and
an atomic ratio of W of the first binder phase is equal to or smaller than an atomic ratio of W of the solid solution phase.

8. The cermet according to any claim 1, wherein
the solid solution phase comprises a site where an atomic ratio of Ti in a region adjacent to the second binder phase among an outer peripheries of the solid solution phase is higher than a mean value of an atomic ratio of Ti of the solid solution phase.

9. The cermet according to claim 1, wherein
the TiCN phase comprises a site where an atomic ratio of Ti in a region adjacent to the second binder phase among an outer peripheries of the TiCN phase is lower than an atomic ratio of Ti at a center of the TiCN phase.

10. The cermet according to claim 1, having a carbon content of 6.00 to 8.00% by mass and a nitrogen content of 5.00 to 7.50% by mass, wherein a ratio of the nitrogen content/(the carbon content+the nitrogen content) is 0.9 to 1.3.

11. A cutting tool comprising the cermet according to claim 1 as a substrate.

* * * * *